(12) United States Patent
Georgescu et al.

(10) Patent No.: US 9,078,121 B2
(45) Date of Patent: Jul. 7, 2015

(54) AUTOMATIC AD-HOC NETWORK OF MOBILE DEVICES

(71) Applicant: Fujitsu Limited, Kanagawa (JP)

(72) Inventors: Serban Georgescu, London (GB); Peter Chow, Kent (GB); Sunil Keshavji Vadgama, Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/180,970

(22) Filed: Feb. 14, 2014

(65) Prior Publication Data

US 2014/0233458 A1    Aug. 21, 2014

(30) Foreign Application Priority Data

Feb. 15, 2013  (EP) ..................................... 13155517

(51) Int. Cl.
| | | |
|---|---|---|
| *H04Q 7/00* | (2006.01) | |
| *G07G 1/14* | (2006.01) | |
| *G06F 17/00* | (2006.01) | |
| *H04W 4/22* | (2009.01) | |
| *H04W 4/08* | (2009.01) | |
| *H04W 84/18* | (2009.01) | |

(52) U.S. Cl.
CPC *H04W 4/22* (2013.01); *H04W 4/08* (2013.01); *H04W 84/18* (2013.01)

(58) Field of Classification Search
USPC .......................................... 370/328, 255, 235
See application file for complete search history.

(56) References Cited

U.S. PATENT DOCUMENTS

| 8,483,652 | B2* | 7/2013 | Hall ............................ 455/404.1 |
|---|---|---|---|
| 2003/0235175 | A1* | 12/2003 | Naghian et al. ............... 370/338 |
| 2006/0002328 | A1* | 1/2006 | Naghian ........................ 370/328 |
| 2007/0214046 | A1* | 9/2007 | Falchuk et al. .................. 705/14 |
| 2007/0281720 | A1 | 12/2007 | Lee |
| 2008/0248778 | A1 | 10/2008 | Boss et al. |
| 2008/0299940 | A1 | 12/2008 | Shaffer et al. |

(Continued)

FOREIGN PATENT DOCUMENTS

| JP | 2011-118728 | 6/2011 |
|---|---|---|
| WO | WO 2006/083931 A1 | 8/2006 |
| WO | WO 2010/036179 A1 | 4/2010 |

OTHER PUBLICATIONS

European Search Report issued Jul. 1, 2013 in corresponding European Application No. 13155517.9.

(Continued)

*Primary Examiner* — Edan Orgad
*Assistant Examiner* — Sithu Ko
(74) *Attorney, Agent, or Firm* — Staas & Halsey LLP (57) ABSTRACT

A process for the automatic creation of ad-hoc networks between mobile devices in emergency and evacuation events. During an emergency or an evacuation event a command centre (20) issues a special emergency warning to mobile network operators, in response to which the operators broadcast over the mobile network (10) a trigger message to the mobile devices (11-14) that they service. Receipt of the trigger message causes the mobile devices (11-14) in a given geographical area to search for their neighbours and to form groups each having a leader, subsequent communication between the group and the mobile network (10) being conducted via the leader, communications within the group being conducted for example by using Bluetooth or WiFi. In this way, both resources in the mobile network and battery power of the mobile devices are conserved.

14 Claims, 3 Drawing Sheets

(56) References Cited

U.S. PATENT DOCUMENTS

| | | | |
|---|---|---|---|
| 2009/0075625 A1 | 3/2009 | Jackson et al. | |
| 2009/0201850 A1* | 8/2009 | Davis et al. | 370/328 |
| 2009/0303993 A1 | 12/2009 | Hochendoner et al. | |
| 2010/0197279 A1 | 8/2010 | Kreo et al. | |
| 2011/0151828 A1 | 6/2011 | Gou et al. | |
| 2011/0275385 A1 | 11/2011 | Escolar-Piedras et al. | |

OTHER PUBLICATIONS

Donatas Sumyla, "Mobile Ad-hoc Networks (manets)", Mar. 20, 2006, 22pp.

Jaap Haartsen, "Bluetooth—The Universal radio interface for ad hoc, wireless connectivity", Ericson Review No. 3, 1998, pp. 110-117.

IEEE Standard for Information Technology, Part 11: Wireless LAN Medium Access Control (MAC) and Physical Layer (PHY) Specifications, IEEE Computer Society, Feb. 25, 2011, 190pp.

Sonia Majid et al, "Mobile Handsets as Sensing Nodes in an Auto-Configured Hierarchical Cognitive Radio Network Scheme for Immediate Post-Disaster Communications", IEICE Trans. Commun., vol. E92-B. No. 7 Jul. 2009, pp. 2397-2405.

"The Future of Hotspots: Making Wi-Fi as Secure and Easy to Use as Cellular", Cisco , 2012, pp. 1-9.

Bin Liu et al, "Cross-Layer Design of the Inter-RAG Handover between UMTS and WiMax", EURASIP Journal on Wireless Communications and Networking, 2010, pp. 1-6.

Maurits de Graaf et al, "EasyWireless: broadband ad-hoc networking for emergency services", The Sixth Annual Mediterranean Ad Hoc Networking Workshop, Jun. 2007, pp. 32-39.

NamKyung Lee et al, "Broadband Mobile Ad hoc Network System for Emergency Communications" 5 pp.

Shabbir Ahmad et al, "An Architecture model of Mobile Ad Hoc Network and its Performance in Disaster Area Architecture", Proceedings of the $4^{th}$ National Conference, Feb. 25-2, 2010, 5pp.

Takahiro Fujiwara et al, "A Wireless Network Scheme Enhanced with Ad-Hoc Networking for Emergency Communications", 3pp.

Madhavi Subbarao et al, "Mobile Ad Hoc Data Networks for Emergency Preparedness Telecommunications—Dynamic Power-Conscious Routing Concepts", Wireless Communications Technologies Group, Feb. 1, 2000, 4pp.

\* cited by examiner

AUTOMATIC AD-HOC NETWORK OF MOBILE DEVICES

CROSS REFERENCE TO RELATED APPLICATIONS

This application claims the benefit of European Application No. 131555617.9, filed Feb. 15, 2013, the disclosure of which is incorporated herein by reference.

FIELD OF THE INVENTION

The present invention relates to ad-hoc networks of mobile devices, more particularly ad-hoc networks for use in emergency situations.

BACKGROUND OF THE INVENTION

Wireless networks are widely known in which mobile devices communicate with base stations within range, the base stations forming "cells" and the mobile devices being handed over from one cell to another as they move around the network. Such networks, referred to below as "wireless cellular networks", are planned and centralised, with a mobile operator responsible for their construction and maintenance.

'Ad-hoc' mobile networks are very different from such wireless cellular networks. Without centralised control, an ad-hoc network must assemble itself from any devices that happen to be nearby, and adapt as devices move in and out of wireless range. The building blocks of ad-hoc mobile networks are low-power devices that must do their own wireless routing, forwarding signals from other devices that would otherwise be out of radio range. As such, ad-hoc networks tend to be short-range in comparison with the longer-range wireless communication possible in wireless cellular networks.

Various wireless protocols are capable of being used for ad-hoc networking, such as WiFi, Bluetooth and ZigBee. Recently, smartphones have become available which offer such short-range wireless functionality in addition to being compliant with one or more wireless cellular network standards such as GSM, 3G, LTE or WiMAX.

Recent events such as the Tōhoku earthquake and tsunami in Japan in March 2011, have highlighted the value of mobile devices. Apart from capturing images and reporting to the world the gravity of the situation, such devices can receive warnings via the mobile operator in the forms of news, SMS, etc. Smart mobile devices with GPS and suitable applications can determine their locations and warn users of imminent threats like an oncoming tsunami or hurricane.

A major problem in any large-scale emergency is the huge demand on the mobile infrastructure resources. Everyone wants to make a call or send a message at once, leading to system overload and unavailability. However, if during such emergencies mobile devices could collaborate and organize themselves into small groups, this demand could be greatly decreased. In such groups, rather than multiple devices using the voice, SMS service or accessing the Internet at the same time, only one selected device performs these tasks on the behalf of the group.

Currently, many mobile devices are capable of wirelessly exchanging information via protocols like Bluetooth or WiFi. However, for security reasons, such access usually requires express authorization from the user. Moreover, in order to save battery or simply because of a lack of need, some of these protocols may be disabled at any given time.

There is consequently a need for a technology that, in the event of an emergency, deals with the automatic enabling and setup of such protocols and their automatic configurations for the purpose of ad-hoc networking.

SUMMARY OF THE INVENTION

According to a first aspect of the present invention, there is provided a method of forming an ad-hoc network from a group of terminals among a plurality of terminals, comprising, at a said terminal:
  in an initial state of being configured to perform wireless communication via a base station, receiving an emergency code from the base station;
  reconfiguring one or more settings of the terminal in response to the emergency code;
  searching for other terminals in the vicinity and exchanging capability data with terminals found in the search;
  comparing the terminal's capability data with capability data received from the found terminals; and
  if indicated by the comparison:
    requesting to join with a found terminal in a group with the found terminal acting as leader of the group; and
    if the request is accepted, performing wireless communication via the leader terminal instead of via the base station.

Here, "indicated by the comparison" means that the result of the comparison indicates one of the found terminals has a greater capability to be leader, compared with the said (or first) terminal.

The above steps are carried out automatically and autonomously (that is, without user intervention).

One of the above terminals will not perform the above requesting, because to do so will not be indicated by the comparison; more particularly this terminal will be the one most suited to act as leader on the basis of the capability data. Therefore the above method preferably further comprises, at a said terminal:
  receiving a request to join a group as the leader of the group; and
  confirming acceptance of the request and performing wireless communication via the base station on behalf of each other terminal in the group.

In the above method, the reconfiguring preferably comprises retrieving one or more stored settings of the terminal, including one or more of settings related to:
  enablement to participate in the ad-hoc network; and
  enablement to act as leader of a group.

These settings will preferably be stored within a memory of the terminal, although they could be downloaded from the wireless communication system via the base station. The settings may be predetermined without involvement of the user, or may include one or more user preference settings.

Normally, the wireless communication within the group (in other words the ad-hoc wireless communication) will be performed using a different wireless technology from that used by the terminal to communicate with a base station. Therefore, preferably, the reconfiguring comprises activating a second wireless function of the terminal additional to a first wireless function used for wireless communication via the base station, said second wireless function being employed in the searching, requesting and performing. Such a second wireless function used to implement the ad-hoc network is referred to later as a "discovery element".

Such a second wireless function may be shorter-range and lower-power than wireless communication with the base station. It could include a wireless unit compliant with WiFi (IEEE 802.11), which is an example of a Wireless LAN (WLAN) technology, or Bluetooth (IEEE802.15), which is an example of a Wireless Personal Area Network (WPAN) technology. It may also include a WiFi "access point" mode or WiFi Direct mode. The features offered by IEEE802.11u (see below) can also be advantageously applied. Various implementations are possible as explained in the detailed description.

Preferably, the usual requirement for user-initiation to set up a wireless link is bypassed by taking advantage of the possibilities offered by, for example, WiFi Direct, or IEEE802.11u for emergency messaging, or in some other way, such that devices link up automatically in response to the emergency code trigger.

The second wireless function will normally include a scanning function for detecting nearby networks and/or compatible wireless devices. Therefore, the searching includes:

using a scanning mode of the second wireless function to scan for other terminals in the vicinity and, for each terminal found in the scan, attempting to establish wireless communication with the terminal using said second wireless function and if successful, exchanging the capability data with that terminal.

In any method as defined above, the capability data relates to the status of each terminal. It can include any of:

a device model and/or intrinsic features of the terminal;
battery level of the terminal;
signal quality of the terminal with respect to the base station; and
location of the terminal.

Further data to be exchanged may include an identification code of each terminal, although this is not part of the capability data as such. The identification code may be communicated along with the capability data, or at some later time. Such an identification code is useful for allowing the leader to relay, to the intended terminal, communications from the base station. Thus, preferably, the method further comprises the leader obtaining an identification code from each other terminal in the group, and wirelessly communicating to the base station each obtained identification code and its own identification code.

Referring to the "comparing" part of the method, this may involve:

calculating, on the basis of the capability data, a score for the terminal itself and each other terminal with which capability data has been exchanged, to form a list; and performing said requesting to each other terminal in the list scoring higher than the terminal itself, for each said other terminal in turn and in order of the highest score first.

Following a period of acting as the leader of the group, it may be expected that the leader's battery level will become depleted. Thus, the method preferably further comprises the leader detecting that its battery level has fallen to a predetermined threshold value and in response, transmitting a message asking the next-highest scoring terminal in the list to take over as leader. Alternatively, or in the event that the message is not received or not acted upon, the members of the group may spontaneously reform the group and reassign the role of leader. Thus, in one form the method further comprises a terminal repeating the searching and comparing steps, in the event of failure of wireless communication with the leader.

Modern wireless terminals are typically equipped with a receiver for a positioning system such as GPS. Whilst actuated, this function drains battery power and, once a group has been formed in accordance with the invention, it may be assumed that all the members of the group are roughly in the same geographical area. Thus, where a terminal has a positioning function the method preferably further comprises deactivating the positioning function whilst the terminal is performing wireless communication via the leader.

It may be assumed that sooner or later, the emergency condition which prompted issuance of the emergency code no longer applies, and it is possible to return the terminals to their initial state of wireless communication with the base station. Therefore, preferably, the method further comprises receiving an emergency-lifting code from the base station at least by the leader, and each terminal in response automatically reconfiguring one or more settings of the terminal to return to said initial state.

According to a second aspect of the present invention, there is provided a wireless communication system comprising a base station and a plurality of terminals initially configured for wireless communication via the base station, wherein:

the base station is arranged to transmit an emergency code to the terminals; and each terminal is responsive to receipt of the emergency code to:

reconfigure one or more settings of the terminal;
search for other terminals in the vicinity and exchange capability data with terminals found in the search;
compare the terminal's capability data with capability data received from the found terminals, and if indicated by the comparison:
request to join with a found terminal in a group with the found terminal acting as leader of the group; and
if the request is accepted, perform wireless communication via the leader terminal instead of via the base station.

According to a third aspect of the present invention, there is provided a terminal for use in a wireless communication system and comprising:

a first wireless function for communication with a base station of the wireless communication system and operable to receive an emergency code;

a second wireless function for wireless communication with other wireless devices in the vicinity independently of the base station; and a control unit responsive to the emergency code to:
search for other terminals in the vicinity using the second wireless function and exchanging capability data with terminals found in the search;
compare the terminal's capability data with capability data received from the found terminals; and
if indicated by the comparison:
using the second wireless function, request a found terminal to join a group with the found terminal acting as leader of the group; and
if the request is accepted, deactivate the first wireless function and perform wireless communication using the second wireless function.

A further aspect of the present invention provides software which, when executed by a control unit of a mobile terminal, provides the terminal as defined above. Such software may be stored on one or more non-transitive computer-readable recording media.

Embodiments of the present invention allow the automatic creation of networks between mobile devices in emergency and evacuation events via which to ensure robust connectivity for a prolonged time. By enabling mobile devices to automatically cooperate and coordinate with other mobile devices found in their proximity, major communication barriers associated with such emergencies can be overcome. Using the process described in this invention, the natural and spontaneous cooperation between humans found together in an emergency is taken to their mobile devices.

Some advantages of the invention are:

A major reduction in the number of connections to the mobile operator, achieved by establishing one communication channel per group rather than per individual mobile device, can overcome operator capacity limitations Instant messaging capability for all devices can be sustained for longer by relaying all messages through the group leader The location of/direction to nearest exit points can be sent to groups of mobile devices via multicast protocols Location information can be sent to the command centre only once, by the group leader, thus saving the large amounts of battery power associated with using the GPS function in each individual device Overall energy consumption in each group is reduced, thus mobile devices can keep functioning for a longer time.

BRIEF DESCRIPTION OF THE DRAWINGS

Reference is made, by way of example only, to the accompanying drawings in which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

This invention solves the problem of setting up the collaboration with nearby devices in the event of an emergency trigger. The mechanism and protocol process to form dynamic groups is automatic and may be based on users' preset preference. More specifically, the aspects addressed by this invention include the following:

1. Dealing with current mobile device settings that prohibit or hinder the creation of the ad-hoc network
2. The automatic creation of groups of mobile devices and that of the ad-hoc network
3. The choosing of a leader of the group
4. The maintaining of the network structure in dynamic conditions
5. Taking user preferences into account while establish the ad-hoc network.

Figure 1:
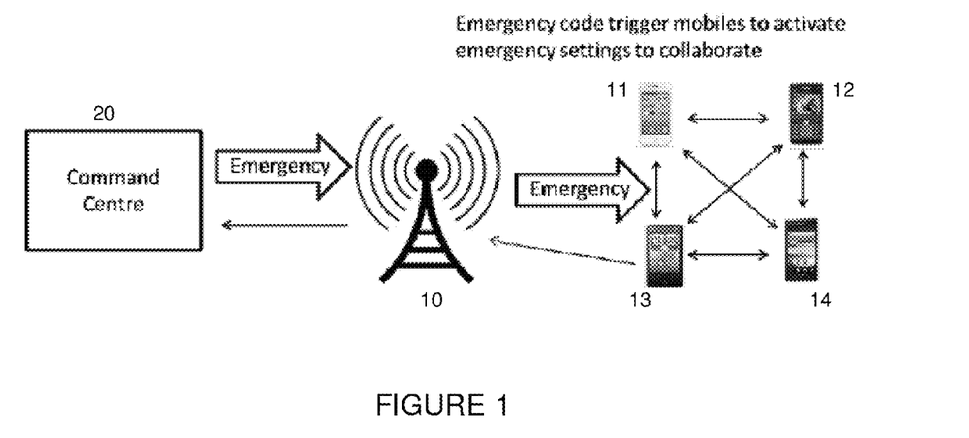
FIG. 1 schematically shows a system including an ad-hoc network in accordance with the present invention.

FIG. 1 illustrates the scenario assumed in one embodiment of the present invention. For simplicity, a single base station 10 is shown, which initially serves various mobile devices (also referred to below as wireless devices or terminals) 11-14 as part of a wireless communication system, such as a 3G or LTE system. In practice, it can be assumed that many base stations would be provided in a given geographical area, operated by different mobile operators.

During an emergency or an evacuation event (e.g. earthquake, tsunami, explosion) a command centre 20 issues special emergency warnings to the mobile operators. Following this warning, the mobile operators broadcast an emergency message to the mobile devices that they service. This is indicated in FIG. 1 by the arrow labelled "emergency" from base station 10.

The receiving of the emergency message by the mobile devices 11-14 triggers a sequence of actions which cause them to self-organize and coordinate in a way which enables them to perform their intended functions more efficiently. That is, groups of mobile devices co-operate to form ad-hoc networks. It should be noted that the steps to be performed are performed autonomously by mobile devices, without requiring user involvement.

Figure 2:
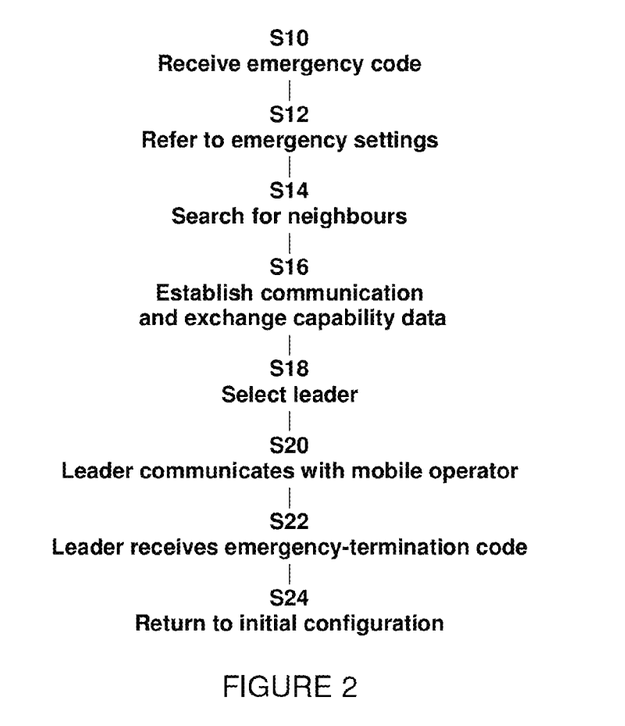
FIG. 2 is an outline of process steps in an embodiment of the present invention.

The process is outlined in FIG. 2 which shows the steps from the perspective of the mobile devices:

S10. A trigger (emergency code) is received which activates the process in each mobile device S12. Initialize settings of the mobile device to users' preferences or standard default S14. Search and find nearby mobile devices S16. Establish communication and exchange data on device model, signal quality and strength, battery level, location, etc.

S18. Select mobile devices to form a group and decide leader based on set parameters S20. Leader mobile device communicates with a command centre, mobile operator or emergency centres (for example an emergency communications coordination server)

S22. A stop signal (emergency termination code) is received to restore the system to its initial state.

The above process will now be described in more detail by referring to FIGS. 3 to 6. Two embodiments will be described in the form of a "static case" (in which the role of leader is assumed to be fixed), and a "dynamic case" (in which the role of leader may be reassigned).

First Embodiment—Static Case

The static case is a simplified situation mainly for explanatory purposes. However, it may be valid in real life if the emergency is relatively short in duration (e.g. a few hours), and the movement of the members is severely restricted (e.g. to a single floor of a building).

S10: Trigger (emergency code) to activate the crisis event management system.

This emergency code, broadcast from the base station 10 in FIG. 1, is capable of being recognised by each mobile device 11-14 without user action. To enable this, each mobile device may be configured to recognise and respond to the emergency code, either as part of the wireless cellular network configuration, or within the specifications of the wireless cellular standard in use. The emergency code may be broadcast along with a textual or audio message intended for the users.

S12: Initialize settings to users' preferences or standard default

Figure 3:
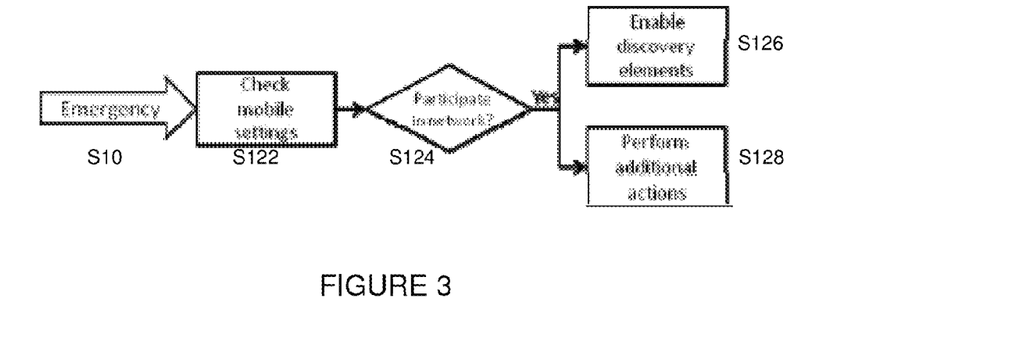
FIG. 3 illustrates an initialisation process in an embodiment of the present invention.

FIG. 3 illustrates this part of the procedure. Upon receiving the trigger signal in S10 ("Emergency" in FIG. 3), in step S122 each mobile device 11-14 reads emergency related settings, either standard defaults or modifications made by the user.

Ideally the latest version of the settings should be stored in the device and this could be updated regularly (scheduled by the network). The settings may be location dependent and again that dependency could be stored in the device. This could be achieved by network sending signal to devices in specific areas to switch one of the pre-determined (one of n) settings profile. Alternatively, the mobile devices can contain a set of settings profiles associated with geographical locations. For example, different settings might be appropriate to a mountainous region, compared with when the device is located in a city. Then without the need for network signalling, the device depending on its current location will switch to the associated settings profile.

It is preferable for devices to minimise communications with the network after the emergency has been declared, in order to minimise traffic load. It would be possible, however, to download the settings after the emergency mode is triggered/activated.

These settings might include, but are not limited to:
(i) Enable/disable participation in the ad-hoc emergency network; and
(ii) Disable participation as leader.

The above settings may be a matter of user preference, and set and stored by user action. The settings might also depend on the kind of user of the wireless device, even without the user himself or herself modifying the settings. For example, a wireless device of a rescue worker or medical staff might be set to enable participation in the ad-hoc network whilst disabling participation as leader, in order to maximise battery life.

In step S124, the mobile device then decides whether to participate in an ad-hoc network. If the mobile settings allow the participation in the ad-hoc network, a number of actions, that can include but are not limited to the following, are taken:

S126: Discovery elements (hardware and/or software features that enable/improve the discovery of and by other mobile devices found in proximity) are enabled. See "Enable discovery elements" in FIG. 3.

Examples of discovery elements are:
Bluetooth connection or WiFi connection
The access point mode or "WiFi Direct mode" of the WiFi connection present in some new mobile devices These discovery elements also provide the means of implementation of the ad-hoc network. To digress slightly, these discovery elements will be outlined briefly by way of background information.

Bluetooth (the common name for the IEEE 802.15 group of standards) is a short-range wireless technology providing a packet-based protocol with a master-slave structure. One master device may communicate with up to seven slave devices in an ad-hoc network called a piconet. At least initially, the device which establishes the piconet takes the role of master, but it is possible for participating devices to change roles if a slave device wants to take over the role of master.

Thus, in one possible implementation of the present invention, the ad-hoc network is a Bluetooth network in which the master device, which effectively already has a Leader/Coordinator role (at least at the wireless connectivity Level), takes the role of leader of the group. Bluetooth is one example of a Personal Area Network (PAN) as mentioned elsewhere in this specification.

A WiFi connection can be employed in various ways in the present invention.

As is well known, WiFi networks (in other words, networks operating in accordance with any of the IEEE802.11 group of standards including 802.11b, 802.11n, 802.11ac and so forth) have two basic topologies. The most common WiFi network topology in homes and offices is the so-called "infrastructure" mode in which a dedicated Access Point (AP), connected to a (wired) backhaul network such as broadband Internet, provides a bridge to a number of wireless devices in wireless communication with the AP. The AP is thus the nearest equivalent to a base station in a wireless cellular telephone system. Since the wireless devices do not communicate with each other directly, only through the AP, this mode is not suitable for use in the present invention with a dedicated, fixed AP. On the other hand, a mobile wireless device having an access point mode and capable of setting up an infrastructure network could, in one possible implementation, act as group leader in the present invention. Examples of such devices include the portable wireless routers marketed under the names "MyFi" and "Pocket WiFi".

However, of more relevance to the present invention, WiFi can also operate in an alternative topology called the "ad-hoc" mode in which wireless devices communicate with each other without involving any central access points or any connection to a wired network. WiFi ad-hoc connection mode is basically a peer-to-peer connection and the specification allows two or more devices to be connected into a best effort mesh arrangement. It is not necessary for every device to directly connect to every other device in the group: the mesh networking provides the routing capability.

Thus, in another possible implementation, the ad-hoc network of the invention employs the conventional "WiFi ad-hoc" connection mode in which the wireless devices form a Mesh Network, where packets are forwarded to a selected node (in this case the group leader) in a group of devices using the same ad-hoc connection configuration.

In another possible implementation, the devices in the group operate in accordance with the newly-specified "WiFi Direct" certification, which is not dependent on any specific IEEE802.11 standard. WiFi Direct mode, also referred to as WiFi P2P, builds on the WiFi ad-hoc mode: it has improved security features (for example it handles WPA2 authentication, in which a different key is used for each session) and is designed for easier (more automated) connection between pairs of devices, using WiFi Protected Setup, such that it is only necessary to bring WiFi Direct devices together and trigger setup of a connection by some user-initiated action such as pressing a button or entering a PIN. Thus, instead of having to connect first to an infrastructure network, devices can connect directly to other devices.

WiFi Direct also enables exchange of device capability information as part of the neighbour device discovery stage. In WiFi Direct mode there is software-access-point functionality embedded in each device. This enables Personal Area Networks to be set-up/formed rapidly and with an increased level of automation. This mode is expected to be available in all WiFi capable phones and other WiFi capable electronic devices (for example cameras, wireless headsets, display screens, printers, scanners, storage devices, scanners etc) for short range communications, thereby providing an alternative means of connection to Bluetooth but potentially with longer reach. Like Bluetooth as already mentioned, WiFi Direct has the capability to form Personal Area networks: networks of more than two devices are called "groups", and one device acts as a "gatekeeper" to control admissions to the group. The Google Nexus 4 is one of the first WiFi Direct certified devices.

Consequently, WiFi Direct provides a particularly suitable form of ad-hoc network for use in the present invention since WiFi Direct builds a "soft" AP into each compliant wireless device, so any wireless device can in principle act as the leader.

Another recent development in WiFi is IEEE802.11u (published on 25 Feb. 2011), which is designed to add features which improve interworking with external networks. The IEEE 802.11u specification contains requirements in the areas of enrolment, network selection, emergency call support, emergency alert notification, user traffic segmentation, and service advertisement. IEEE 802.11 currently makes an assumption that a user's device is pre-authorized to use the network. IEEE 802.11u covers the cases where that device is not pre-authorized. A IEEE 802.11u-compliant network will be able to allow access based on the users relationship with an external network (e.g. hotspot roaming agreements), or indicate that online enrolment is possible, or allow access to a strictly limited set of services such as emergency services (client to authority and authority to client.)

Thus, of relevance to the present invention, IEEE802.11u is of assistance in enabling rapid identification and selection of an appropriate WiFi device/AP to connect to. The IEEE802.11u features will help each device to identify capabilities of the neighbour devices (i.e. in terms of emergency communications support through the backhaul to the emergency communications coordination server) before attachment. This will help conserve battery power of the client WiFi devices. In addition, the IEEE802.11u standard helps establish WiFi connections more rapidly, optionally removing the need for authentication and potentially elaborate key presses.

Interworking between IEEE802.11u networks and cellular networks is covered from the cellular network perspective in, for example, the 3GPP standards document 3GPP TS 24.234. The documents IEEE Std 802.11u-2011Part 11: "Wireless LAN Medium Access Control (MAC) and Physical Layer (PHY) Specifications Amendment 9: Interworking with External Networks", and 3GPP TS 24.234, "3GPP system to Wireless Local Area Network (WLAN) interworking; WLAN User Equipment (WLAN UE) to network protocols", are hereby incorporated by reference.

Returning to the process being described, the discovery elements are used, firstly, to find nearby devices having the same kind of wireless function (in other words, which use the same wireless technology) and secondly, for communication among the members of the ad-hoc network after it has been formed. Thus, it is envisaged that wireless communication among the members of the ad-hoc network will be performed by a different (typically shorter-range, lower-power) wireless technology from wireless cellular communication of each wireless device with the base station. However, this is not necessarily the case: for example the ad-hoc network could be based around an ad-hoc mode of the same wireless cellular technology (such as the mesh mode in WiMAX).

S128: Additional actions are performed such as preparing handshake data.

This will include, for example, time and frequency synchronization for communication via a given communications technology, and (if an ad-hoc network has already been formed) any data needed to associate with the ad-hoc network.

Considering the mobile device's current status including its battery level, the transmission power of the device can be set to higher/lower levels in order to increase the range of discovery and communication, or to preserve battery life.

Meanwhile, any non-essential applications running on each device are preferably stopped, in order to conserve battery power.

S14: Search and find nearby mobile devices and exchange data on device model or class, signal quality and strength, battery level, location, etc.; and S16: Establish communication and exchange capability data Each mobile device that chooses to participate in the ad-hoc emergency network uses the discovery elements (e.g. WiFi or Bluetooth enabled during Step 2) to find additional mobile devices in its proximity. The same discovery elements are used for the mobile device to be found by other mobile devices in its proximity. Following this process, an ad-hoc network is setup with the neighbours.

Figure 4:
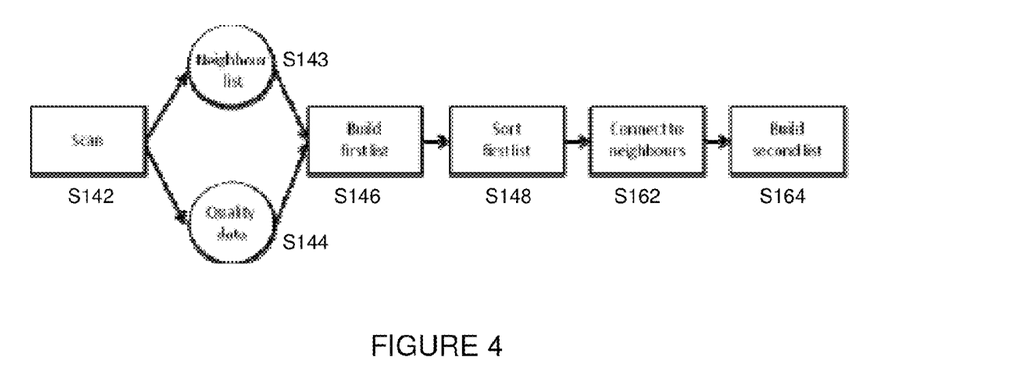
FIG. 4 illustrates a process of finding neighbours in an ad-hoc network.

FIG. 4 illustrates this part of the process (steps S14, S16) in more detail.

Each mobile device independently builds its private list of neighbours using the discovery elements at its disposal. This is done as follows:

S142: The scan function implemented in the each discovery element is used to discover neighbour mobile devices (S143).

Connection quality information (S144) is associated with each neighbour device found. One possible quality measure is the signal strength measured by the mobile device which performs the scan.

These data are combined to build a first list (S146). Thus, in the example of FIG. 1, the list built by mobile device 11 might include all of devices 12, 13 and 14; the list for device 12 might include devices 11, 13 and 14; and so on.

S148: The first list is sorted using the quality information as the key, such that neighbouring mobile devices with better connection quality are at the beginning of the list S162, S164: A second list of neighbours is then created from the first list of neighbours in the following way:

(a) Do until the list is empty or until the maximum number of allowed neighbours has been reached:

(b) extract and remove top element from first list (c) try to establish a connection with the neighbouring device (d) if connection is established: exchange status data and add to list In this process, the purpose of limiting to a maximum allowed number of neighbours is to conserve battery life, since maintaining multiple connection and routing packets are resource intensive tasks. Also, some mobile devices may have an inherent restriction on the number of other devices with which they may communicate in an ad-hoc network. For example, when using its Internet Sharing feature (soft AP mode), the Apple iPhone 4 mobile phone can support a maximum of five client devices at the same time.

The status information (capability data) that is exchanged with neighbouring mobile devices can include but is not limited to:

Battery level

Signal level (with respect to the base station 10)

Available hardware and features (which can be indicated by specifying the device model, or the "class" of the terminal according to LTE specifications).

The structure of the ad-hoc network of mesh type follows the connectivity defined by the second list of neighbours. In the following, the term "list of neighbours" will mean this second list of neighbours.

S18: Selection of mobile devices to form a group and decide leader based on set parameters After the membership of the group (and thus the basis structure of the ad-hoc network) has been decided, a so-called leader is selected. The "leader" is so named because (by virtue of its capabilities) it is chosen as the one mobile device with which to communicate with the base station 10 via the wireless cellular network, and to act as a relay for communications of the other devices connected to it via the ad-hoc network. The leader mobile device together with all the mobile devices connected to it (members) form the group. One terminal can only belong to one group at a time, and in the simplest case all members of the group employ the same wireless technology for communications with the leader.

The leader may correspond to the master device in a Bluetooth piconet, or the gatekeeper in a WiFi Direct group.

Figure 5:
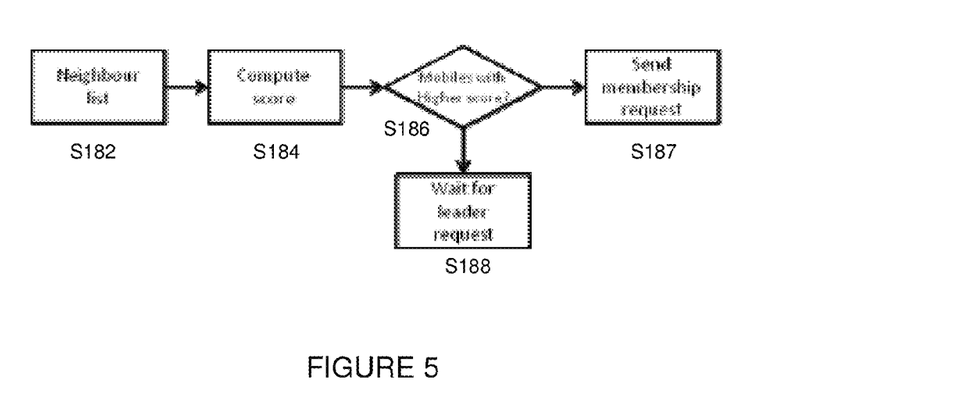
FIG. 5 illustrates a process of choosing a leader among a group of devices.

FIG. 5 illustrates this part of the process. Starting at S182 from the "second list" built in S16, the process of selecting a leader is as follows:

S184: Using the capability data found in step S16, each mobile device computes a score (a real number) for each mobile device in its list of neighbours and for itself. The higher the score, the greater the capabilities of the mobile device (and thus the greater its suitability to act as the leader). The members of the list may be denoted #1, #2, and so on.

S186: A comparison is made between the score of the mobile device itself, and that of each other mobile device in turn. If there exist mobile devices with scores greater than own score, then for each such mobile device, in the order of scores from high to low (in other words from device #1 to #n):

S187: Send a request for the neighbouring device to become a leader. If the request is accepted, become a member of the group (or "follower") with that device as the group leader. If the request is not accepted, continue with the next device in the second list.

The score is computed as a function of the status information that is exchanged during S14. For example, devices with higher signal strength and battery level receive a higher score. It is also possible to assign a score of 0, meaning to exclude from becoming a leader, to devices not considered to have the hardware/software capacity necessary for accomplishing the task of a leader.

In the event of two or more devices having an equal score, some unique identifier (such as phone number or MAC address) may be used to decide between them. That is, the device with the highest (or lowest) value, in an arithmetic sense, of the unique identifier is placed higher in the list.

S188: If there are no neighbour devices with a higher score, the mobile device need take no action, and simply wait to receive a leadership request from another device. Note that the wireless devices only need to make requests to become a member. A request for becoming a leader will automatically come from the neighbouring devices with scores lower than their own, as the scoring algorithm is assumed to be the same for all devices.

It should also be noted that a terminal will start the process of becoming a member/leader only if it is not part of a group at that time. The terminal will not restart the procedure unless it discovers that it is not longer part of a group (see dynamic case). Hence, a terminal can only be part of one group at a time. Bearing in mind that the aim is for members of groups to be able to perform communication with the "outside" world via the leader, this should be done using minimum resources, so that it can be sustained for as long as possible. As long as within the current group, the members are connected to a leader that provides the required connectivity functions, being member of another group does not bring any new benefits, however it consumes resources. Hence the restriction to only one group.

A mobile becoming a leader will notify the mobile operator of its own ID (phone number) and the IDs (phone numbers) of all the current members of the group. This has the additional advantage that the carrier can decide to use multicast protocols to target the members in the group, since by the way the network is created, members of the same group are bound to be in close physical proximity.

This also means that the devices in the group other than the leader can turn off their GPS receivers. Since, by the way the ad-hoc network is constructed, group members are found in close proximity, the GPS location of one mobile device in the group (i.e., that of the leader) is representative for the position of the whole group. Hence, other devices can turn their GPS and/or other location services off, thus saving significant power.

In this way, an ad-hoc network is formed by the terminals in the group. In a given geographical area, several groups may organise themselves in the above manner. The existence of multiple groups/ad-hoc networks is not a problem and indeed may be preferable from the viewpoint of power consumption of the leader or equipment limitations as noted above.

S20: Lead mobile device to communicate with mobile operator or emergency centres Communication proceeds in the following way. For the leader, communication is done directly with the operator via the existing wireless network (GSM, 3G, LTE and so forth). For the other members of the group, communication is done using the leader as a gateway or relay, using the ad-hoc network (Bluetooth, WiFi). In this way, it is possible for the members of the group other than the leader to switch off their wireless cellular network transceiver (GSM, 3G, LTE or whatever) to save power and reduce overhead in the wireless cellular network.

Figure 6:
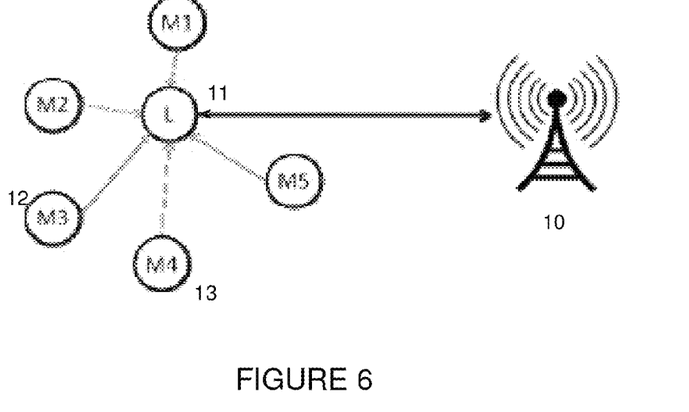
FIG. 6 illustrates communication of devices in a group via the leader.

This is shown schematically in FIG. 6. The leader device 11 (here denoted L) performs wireless communication with the base station 10 as indicated by the solid arrow. Members 12, 13, 14 and so on (M1-M5) communicate with the mobile operator indirectly, via the leader L, communications with the leader being indicated by dashed arrows to denote short-range wireless. Incidentally, all communications are two-way in general. Interworking protocols such as those specified for IEEE802.11u may be used to ensure seamless connectivity between the wireless cellular network and the ad-hoc network.

Such communications may include, for example, from the wireless devices (ie. on the uplink), information about conditions in the area where they are located (images, audio, sensor readings such as temperature, and so forth), and on the downlink, advice or instructions from a command centre.

As an example of uplink communication, in case of sensor traffic such as medical sensors for telemedicine, one can imagine such sensors getting caught-up in emergency situation and being mobile (on person). Depending on the medical category the sensor data may need to be relayed back to appropriate medical facility. In some medical categories, the sensor data will not be relayed to reduce network congestion. The local sensor/own gateway devices may still log the data. Other types of sensors should not automatically join the ad-hoc networks unless commanded to do so by the central command (for example to monitor flood water levels, temperature or a like parameter relevant to the emergency).

As an example of downlink communication, the direction to nearest exit points or other points believed to be safe can be sent using text messages and/or email to the mobile device acting as leader and from there, by the same means, to mobile devices connected to the leader. Using the current invention, the command centre sending these instructions can take into account the position (e.g. GPS coordinates) of the group leader. The way the ad-hoc network is constructed ensures that the mobile devices connected to the group leader are in close physical proximity, therefore the command centre can consider the position of the leader as representative for the whole group. In this way, the invention eases the task of the command centre to send position-based instructions to the group.

S22: Stop signal (emergency termination code) to restore the system at its initial state.

A second signal consisting of an emergency termination code is sent in order to notify the mobile devices that the crisis is over and communication can proceed business as usual. The signal is broadcasted directly to all mobile devices since it is assumed that there is no shortage of network capacity. The signal may alternatively, or in addition, be forwarded to each member device via the leader. This will cover the situation where, for example, in order to save power, member terminals have switched off their connection to the base station. Upon receiving this signal, each mobile terminal restores the settings to their usual values.

The term "business as usual" is used to differentiate from the "emergency" situation. It is usually the case that in emergency situations, either because of equipment failure, or, more likely, due to the fact that many terminals try to use the operator networks to communicate in a very short time window, there are capacity limitations on the operator side, and the wireless cellular network becomes unusable. It is in this type of situations that the current invention can be used to greatly reduce the burden on the network by having only leader terminals be in contact with a base station. After the crisis is over, it is assumed that network capacity is back to normal so all terminals can be in direct contact with a base station.

Second Embodiment—Dynamic Case

In the dynamic case, two additional events have to be taken into account.

A time-out in the communication with the leader makes the member realize that the leader is either no longer in range or no longer functional. In this event, the member restarts the procedure from S14 in order to join a new leader.

When a member phone detects that its battery has reached a level lower that a prescribed threshold, with the meaning that it will soon stop operating, the member phone will send the mobile operator, via the leader, its status and its current physical location, in the form of a message like "Terminal x: disconnecting due to low battery. Last location=(lat,long)". It means that communication is terminated "normally".

When a member phone detects that its battery has reached a level lower that a prescribed threshold, with the meaning that it will soon be unable to perform its function of leader, it will defer leadership to the highest scoring neighbouring mobile device in its member list. That is, the leader will simply tell the next highest-scoring device to take over. After that, the leader will become a member under the new leader.

This will also necessitate informing the other members of the group. For example, the device designated by the leader could signal its acceptance to the leader which could then send a multicast message to the whole group, informing them of the fact.

Figure 7:
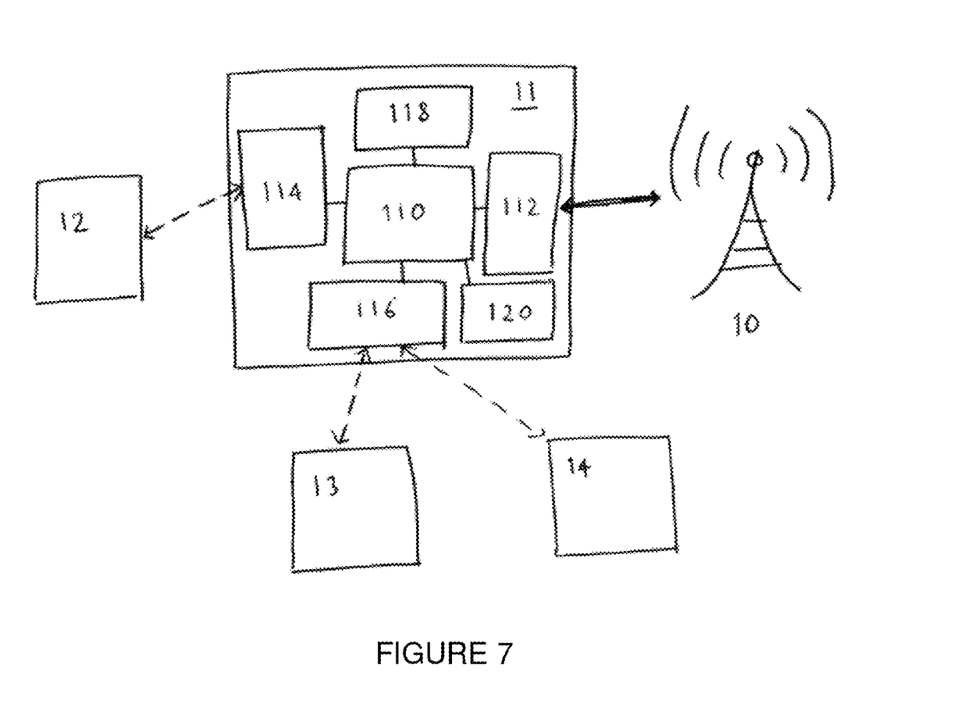
FIG. 7 is a schematic illustration of functional blocks in a terminal acting as leader.

FIG. 7 shows function blocks of a mobile device for use in the present invention and in particular one capable of acting as the leader of the ad-hoc group.

This mobile device 11 has a control unit for controlling, including activating/deactivating, various other functional blocks. These include a wireless transceiver 112 for wireless communication with the base station 10; another wireless function 114 such as WiFi for communicating with a nearby wireless device 12; and a further wireless function 116 such as Bluetooth, for wireless communication with other wireless devices 13 and 14. The control unit 110 has access to a memory 118 for storing various settings, such as the user's preferences with respect to participation in the ad-hoc network either as member or leader. In addition the control unit is connected to a GPS receiver 120 for acquiring its position.

When the wireless device 11 is acting as leader, it communicates with base station 112 via the wireless transceiver 112 using, for example, an LTE wireless connection. The wireless device 11 receives messages intended for any or all of the group members as well as itself. It relays any messages received from the base station 10 and intended for any of the other group members 12, 13 or 14, by use of the appropriate wireless function 114 and/or 116. The control unit 110 continues to keep the GPS function 120 activated in order to track the device's position and notify this to the base station and hence, to the mobile operator and/or emergency services.

To summarise, embodiments of the present invention provide a process for the automatic creation of ad-hoc networks between mobile devices in emergency and evacuation events. By enabling mobile devices to automatically cooperate and coordinate with other mobile devices found in their proximity, major communication barriers associated with such emergencies can be overcome.

During an emergency or an evacuation event a command centre issues special emergency warnings to mobile network operators, in response to which the operators broadcast a trigger message to the mobile devices that they service. Receipt of the trigger message causes the mobile devices in a given geographical area to search for their neighbours and to form groups each having a leader, subsequent communication between the group and the mobile network being conducted via the leader, and communications within the group being conducted for example by using Bluetooth or WiFi. In this way, both resources in the mobile network and battery power of the mobile devices are conserved.

Various modifications are possible within the scope of the present invention.

The above description has referred to "an emergency" implying that every kind of emergency is treated in the same way. However, this is not essential and it would be possible to define multiple levels of emergency with somewhat differing responses to each. As an example, in a highest level of emergency, any user preferences regarding participation in the ad-hoc network would be disregarded, whilst such preferences would be respected in the case of a lower level of emergency.

In the simplest case, a single kind of wireless function (such as WiFi) is used in common by all the wireless devices in the group for ad-hoc networking. However, this is not essential, and a suitably-equipped leader device could employ two or more types of wireless function simultaneously. For example, as indicated in FIG. 7, the leader device 11 could communicate with one or more devices via WiFi and with other devices by Bluetooth. Thus, the ad-hoc network may be one in which the members communicate using more than one short-range wireless protocol simultaneously, so long as the leader is capable of operating with each such protocol.

In this case, the first and second lists referred to above could be combined lists covering devices discovered by scanning with any available wireless function, perhaps with a suitable weighting to favour a wireless function of lower power consumption.

In the embodiment described above, it is not permitted for a wireless device to opt out of the role of leader. Alternatively, it would be conceivable to allow a wireless device to return a "no leader" indication as part of their status information, but this is not preferred. The reason for this is that, besides having a high score, there is an additional condition to becoming a leader of another mobile device: the leader has to still have room for a new device in its list of "followers". The current number of followers of a mobile device is only known to that mobile device.

As an example, consider the case of ten mobile devices in the same vicinity, the first one having score 1, second having score 2 and so on up to score 10. Consider also that the maximum allowed number of devices that can connect to a leader is 5. Initially, devices #1 to #9 will send requests to device #10 to become their leader. However, due to the capacity limitations of #10, devices #6,#7,#8 will have to choose #9 as their leader. This situation cannot be handled by a system where all devices but #10, including #9, set a "no leader" flag.

FIG. 1 depicts wireless devices in the form of smartphones, but this is not essential. The wireless devices need not be mobile telephones, and indeed might not all be mobile (since a fixed terminal, so long as it has power available, may usefully contribute to the ad-hoc group). For example a Wi-Fi hotspot connected to a wired backhaul network can also be useful in emergency situations, in order to route the traffic to the nearest emergency centre. Moreover the wireless devices need not all have human users; the devices may include MTC (Machine-Type Communication) devices if suitably equipped to carry out the method of the invention.

In a real-life scenario, it may be expected that the wireless devices seeking to form a group will be served by different mobile operators; however, this should not affect implementation of the invention. It is normal practice for mobile phones to be able to make emergency calls on any available wireless network even if they are not contracted to the operator of the network; consequently, the wireless device 11 most capable to do so should be able to act as leader, regardless of any contractual arrangements with the operator of the base station 10.

Regarding the determination of capability and assigning of a score to each wireless device, with the highest-scoring device becoming the leader, it would of course be possible to reverse the arrangement such that a lower score represented greater suitability and the lowest-scoring device is chosen as leader.

The above description of the second embodiment assumed that the reason for changing the leader is inability of the current leader to continue in that role, owing to depleted battery. However, this is not the only criterion for changing the leader. Restarting after a set amount of time would also be a viable alternative. One of the benefits of this approach would be that the leader position could be deferred more often, hence there will be less "stress" associated with one particular device.

The flowcharts and block diagrams of the Figures illustrates the architecture, functionality, and operation of possible implementations of apparatuses, methods and computer program products according to various embodiments. In this regard, each block in a flowchart or block diagram may represent a module, segment, or portion of a code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending on the functionality involved. It will also be noted that each block of a block diagram and/or flowchart illustration, and combinations of blocks in a block diagram and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting. While the foregoing description describes several embodiments of the present invention, it will be understood by those skilled in the art that variations and modifications to these embodiments may be made without departing from the spirit and scope of the present disclosure as defined by the appended claims and their equivalents. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

INDUSTRIAL APPLICABILITY

Embodiments of the present invention allow the automatic creation of networks between mobile devices in emergency and evacuation events via which to ensure robust connectivity for prolonged time. By enabling mobile devices to automatically cooperate and coordinate with other mobile devices found in their proximity, major communication barriers associated with such emergencies can be overcome.

Although a few embodiments have been shown and described, it would be appreciated by those skilled in the art that changes may be made in these embodiments without departing from the principles and spirit of the invention, the scope of which is defined in the claims and their equivalents.

The invention claimed is:
1. A method of forming an ad-hoc network from a group of terminals among a plurality of terminals, comprising, at a terminal:
   in an initial state of being configured to perform wireless communication via a base station, receiving an emergency code from the base station;
   reconfiguring one or more settings of the terminal in response to the emergency code;
   searching for other terminals in the vicinity and exchanging capability data with terminals found in the search;
   comparing the terminal's capability data with capability data received from the found terminals; and
   if indicated by the comparison:
      requesting the found terminal to become leader of a group of terminals to form the ad-hoc network; and
      if the request is accepted, becoming a member of the group and performing wireless communication via the leader terminal instead of via the base station;
   wherein the reconfiguring comprises activating a second wireless function of the terminal additional to a first wireless function used for wireless communication via the base station, said second wireless function being employed in the searching, requesting and performing.
2. The method according to claim 1, further comprising, at a said terminal:
   receiving a request to join a group as the leader of the group; and
   confirming acceptance of the request and performing wireless communication via the base station on behalf of each other terminal in the group.

3. The method according to claim 1, wherein the reconfiguring comprises retrieving one or more stored settings of the terminal, including one or more of settings related to:
   enablement to participate in the ad-hoc network; and
   enablement to act as leader of a group.

4. The method according to claim 1, wherein the searching includes:
   using a scanning mode of the second wireless function to scan for other terminals in the vicinity and, for each terminal found in the scan,
   attempting to establish wireless communication with the terminal using said second wireless function and if successful, exchanging the capability data with that terminal.

5. The method according to claim 1, wherein the second wireless function includes one or more of a wireless LAN function, wireless LAN access point function, and a wireless Personal Area Network function.

6. The method according to claim 1, wherein the capability data includes any of:
   a device model;
   intrinsic features of the terminal;
   battery level of the terminal;
   signal quality of the terminal with respect to the base station;
   location of the terminal.

7. The method according to claim 1, further comprising the leader obtaining an identification code from each other terminal in the group, and wirelessly communicating to the base station each obtained identification code and its own identification code.

8. The method according to claim 1, wherein the comparing comprises: calculating, on the basis of the capability data, a score for the terminal itself and each other terminal with which capability data has been exchanged, to form a list; and
   performing said requesting to each other terminal in the list scoring higher than the terminal itself, for each said other terminal in turn and in order of the highest score first.

9. The method according to claim 1, further comprising the leader detecting that its battery level has fallen to a predetermined threshold value and in response, transmitting a message asking the next-highest scoring terminal in the list to take over as leader.

10. The method according to claim 1, further comprising a terminal repeating the searching and comparing in the event of failure of wireless communication with the leader.

11. The method according to claim 1, wherein a-said terminal has a positioning function and further comprising deactivating the positioning function whilst the terminal is performing wireless communication via the leader.

12. The method according to claim 1, further comprising receiving an emergency-lifting code from the base station at least by the leader, and each terminal in response reconfiguring one or more settings of the terminal to return to said initial state.

13. A wireless communication system comprising a base station and a plurality of terminals initially configured for wireless communication via the base station, wherein:
   the base station is arranged to transmit an emergency code to the terminals; and
   each terminal is responsive to receipt of the emergency code to:
      reconfigure one or more settings of the terminal including activating a second wireless function of the terminal additional to a first wireless function used for wireless communication via the base station, and to employ said second wireless function to:
      search for other terminals in the vicinity and exchange capability data with terminals found in the search;
   compare the terminal's capability data with capability data received from the found terminals, and if indicated by the comparison:
      request the found terminal to become leader of a group of terminals to form the ad-hoc network; and
      if the request is accepted, become a member of the group and perform wireless communication via the leader terminal instead of via the base station.

14. A terminal for use in a wireless communication system and comprising:
   a first wireless function for communication with a base station of the wireless communication system and operable to receive an emergency code;
   a second wireless function for wireless communication with other wireless devices in the vicinity independently of the base station; and
   a control unit responsive to the emergency code to reconfigure one or more settings of the terminal including activating a second wireless function of the terminal additional to a first wireless function used for wireless communication via the base station, and to employ said second wireless function to:
      search for other terminals in the vicinity using the second wireless function and exchanging capability data with terminals found in the search;
   compare the terminal's capability data with capability data received from the found terminals; and if indicated by the comparison:
      using the second wireless function, request a found terminal to become leader of a group of terminals to form the ad-hoc network; and
      if the request is accepted, deactivate the first wireless function, become a member of the group and perform wireless communication using the second wireless function.

* * * * *

UNITED STATES PATENT AND TRADEMARK OFFICE
CERTIFICATE OF CORRECTION

PATENT NO.        : 9,078,121 B2                                    Page 1 of 1
APPLICATION NO.   : 14/180970
DATED             : July 7, 2015
INVENTOR(S)       : Serban Georgescu It is certified that error appears in the above-identified patent and that said Letters Patent is hereby corrected as shown below:

In the specification

Column 1, Line 8 (Approximately)

Delete "131555617.9," and insert --13155517.9,--, therefor.

In the claims

Claim 2, Column 16, Line 62

Delete "a said" and insert --a--, therefor.

Claim 11, Column 17, Line 48

Delete "a-said" and insert --a--, therefor.

Signed and Sealed this
Twenty-seventh Day of October, 2015

Michelle K. Lee
*Director of the United States Patent and Trademark Office*